(12) United States Patent
Andracki et al.

(10) Patent No.: US 10,182,536 B1
(45) Date of Patent: Jan. 22, 2019

(54) CONTROLLED AQUAPONIC SYSTEM

(71) Applicants: Stephen Andracki, Las Vegas, NV (US); Gabriel Padilla, Las Vegas, NV (US)

(72) Inventors: Stephen Andracki, Las Vegas, NV (US); Gabriel Padilla, Las Vegas, NV (US)

( * ) Notice: Subject to any disclaimer, the term of this patent is extended or adjusted under 35 U.S.C. 154(b) by 628 days.

(21) Appl. No.: 14/814,346

(22) Filed: Jul. 30, 2015

Related U.S. Application Data

(60) Provisional application No. 62/031,647, filed on Jul. 31, 2014.

(51) Int. Cl.
| | | |
|---|---|---|
| A01K 63/00 | (2017.01) | |
| A01G 31/02 | (2006.01) | |
| A01K 63/04 | (2006.01) | |
| A01G 22/00 | (2018.01) | |

(52) U.S. Cl.
CPC ........... *A01G 31/02* (2013.01); *A01G 22/00* (2018.02); *A01K 63/003* (2013.01); *A01K 63/047* (2013.01)

(58) Field of Classification Search
CPC .................................................. A01K 63/003
USPC ................................ 119/224, 226, 246, 247
See application file for complete search history.

(56) References Cited

U.S. PATENT DOCUMENTS

| | | | | |
|---|---|---|---|---|
| 4,486,977 A | * | 12/1984 | Edgecombe | A01G 31/02 47/59 R |
| 8,151,518 B2 | * | 4/2012 | Adams | A01G 31/06 47/82 |
| 8,677,942 B2 | * | 3/2014 | Bodlovich | C02F 3/32 119/226 |
| 9,439,403 B2 | * | 9/2016 | Alshammary | A01G 31/00 |
| 2009/0301399 A1 | * | 12/2009 | Brown | A01G 31/02 119/226 |
| 2011/0041395 A1 | * | 2/2011 | Newbold | A01G 9/18 47/1.4 |
| 2013/0047508 A1 | * | 2/2013 | Toone | A01G 31/02 47/62 R |
| 2014/0041594 A1 | * | 2/2014 | Plante | A01K 63/003 119/227 |
| 2015/0173304 A1 | * | 6/2015 | Davis | A01G 9/02 119/246 |

* cited by examiner

*Primary Examiner* — David J Parsley
*Assistant Examiner* — Danielle A Clerkley
(74) *Attorney, Agent, or Firm* — Legends Law Group, PLLC; Stephen H. Bean, Esq.

(57) ABSTRACT

A controlled aquaponic system is provided. The controlled aquaponic system utilizes horizontal bell siphons mounted external to the plant grow beds, sensors, a controller, a pump, and an index valve to selectively monitor and control the flooding draining, and fluid delivery to the plants. The controlled delivery of nutrient fluids is safer to operate and guards against shock to the aquatic species while also providing high crop yields.

20 Claims, 3 Drawing Sheets

CONTROLLED AQUAPONIC SYSTEM

FIELD OF THE INVENTION

The present invention relates to a controlled aquaponic system that can be utilized to increase plant yields and aquatic species yields in a multiple grow bed system. The field of the invention encompasses closed or semi-closed aquaponic loops for sustainable plant and aquatic species production.

BACKGROUND OF THE INVENTION

Hydroponics is the science of growing plants using nutrient solutions in water to replace traditional soil. It has long been know that plants absorb essential nutrients through inorganic ionic transfer that occurs through a soil substrate. However, the soil merely acts as a storage medium for the necessary nutrients and as a physical support structure for the plant roots. The soil itself is not the necessary component for plant growth. Almost any plant can be grown in an aqueous solution if the plant is physically supported and minerals essential to the plant's growth are introduced into the system.

In hydroponic growing systems, there is a wide array of substrates available for supporting the plant root structure. Such substrates include clay aggregates, glass beads, rice hulls, perlite, pumice, vermiculite, sand, gravel, and many others. The plant nutrients in a hydroponic system are dissolved in the water and delivered to the plants in ionic form as both cations and anions. The essential ionic nutrients for plant growth include calcium, magnesium, potassium, nitrates, nitrites, sulfates, and phosphates. Hydroponics has long been the preferred method of growing plants in scientific and research environments, where nutrient levels, light, and other environmental factors can be more easily and accurately controlled.

The advantages of hydroponic systems are numerous. Significantly, hydroponic systems can be used to grow plants in areas where the soil is either non-existent or insufficient to sustain plant growth. For example, in the 1930's hydroponic grow beds were used by the PanAm airline company to grow beans, tomatoes, and other vegetables for passengers and crew to eat during refueling stops on Wake Island in the middle of the Pacific Ocean. Also, the amount of water needed to grow plants in a hydroponic system is significantly less than traditional irrigation methodology because the water is recycled through the system. Further, hydroponics offers stable and high plant yields, ease of harvesting, and less nutrition pollution because the system is a closed loop. The disadvantages to hydroponics include high costs associated with the grow systems and the expense and difficulty of artificial nutrient delivery.

In the 1970's, researchers and hobbyists began to introduce fish into the aquatics of a hydroponic system. The inclusion of fish or any other aquatic species into a closed hydroponic loop became known as aquaponics. In an aquaponic system, the aquatic species, usually fish, produce the nutrient laden materials, namely ammonia, nitrites and nitrates, that are beneficial to improved plant production. The plants, in turn, clean the water of the fish waste while also adding oxygen back into the system. A single aquaponic system with both plants and fish offers a more robust and efficient method for producing not only healthy plants with higher crop yields but also healthy fish, which can also be a nutrient source for human consumption. The advantages of an aquaponic system over a pure hydroponic system is that the former produces both fish and plants while reducing the amount of artificial nutrients introduced into the system. Aquaponic systems are seen as a more natural and harmonious method of both plant and fish production.

Most aquaponic systems utilize a grow bed with a bell siphon for periodic recycling of the plant water into the fish tank and a pump for continuously moving the water from the fish tank into the grow bed. The water is removed from the grow bed to introduce oxygen to the roots of the plants. In the prior art, the bell siphon is placed either in the center or on the inside edge of the grow bed. For example, U.S. Pat. App. No. 2013/0047508 A1 discloses a single-bed system with the bell siphon (240) located in the back right corner of the bed. Another example is U.S. Pat. App. No. US 2014/0041594 A1, where the bell siphon (38) is shown in FIGS. 1 and 2 to be located in the middle of the grow bed. One disadvantage of locating the bell siphon in the grow bed is that the bell siphon takes up space that would otherwise be used for growing plants. Another disadvantage of this location is that the plant roots tend to grow down into the feed holes located at the bottom of the bell siphon, clogging the bell siphon and reducing the system efficiency.

An aquaponic system with a single grow bed is fairly simple to tune. The periodic discharge of plant water into the fish tank and the continuous recycle of the fish water into the single grow bed is straightforward and both the plants and the fish adapt quickly to the cycle. Introducing multiple grow beds into the system, however, poses numerous challenges that have not been resolved in the art. Multiple grow beds discharging into the same fish tank stress the fish; multiple grow beds with multiple bell siphons tend to fall out of sync and lead to uncontrolled charging and discharging of the tank and the beds thereby threatening to flood the facility and damage equipment and other system resources; and multiple grow beds complicate the water management of the overall system.

There exists a need in the art for a controlled aquaponic system that provides predictable flood, drain, and fluid delivery to both plants and fish. There further exists a need in the art for an aquaponic system that can selective control effluent release from grow beds to more quickly harmonize the overall system. There further exists a need in the art for a controlled aquaponic system that is more reliable and robust.

SUMMARY OF THE INVENTION

The present invention utilizes an index valve in conjunction with a controller, a pump, externally located horizontal bell siphons, and flow sensors to provide a controlled flood, drain, and fluid delivery pattern to the entire aquaponic loop.

It will be appreciated that the drawings are illustrative and not limiting of the scope of the invention which is defined by the appended claims. The embodiments shown accomplish various aspects and objects of the invention. It is appreciated that it is not possible to clearly show each element and aspect of the invention in a single figure, and as such, multiple figures are presented to separately illustrate the various details of the invention in greater clarity.

DETAILED DESCRIPTION OF THE INVENTION

Figure 1:
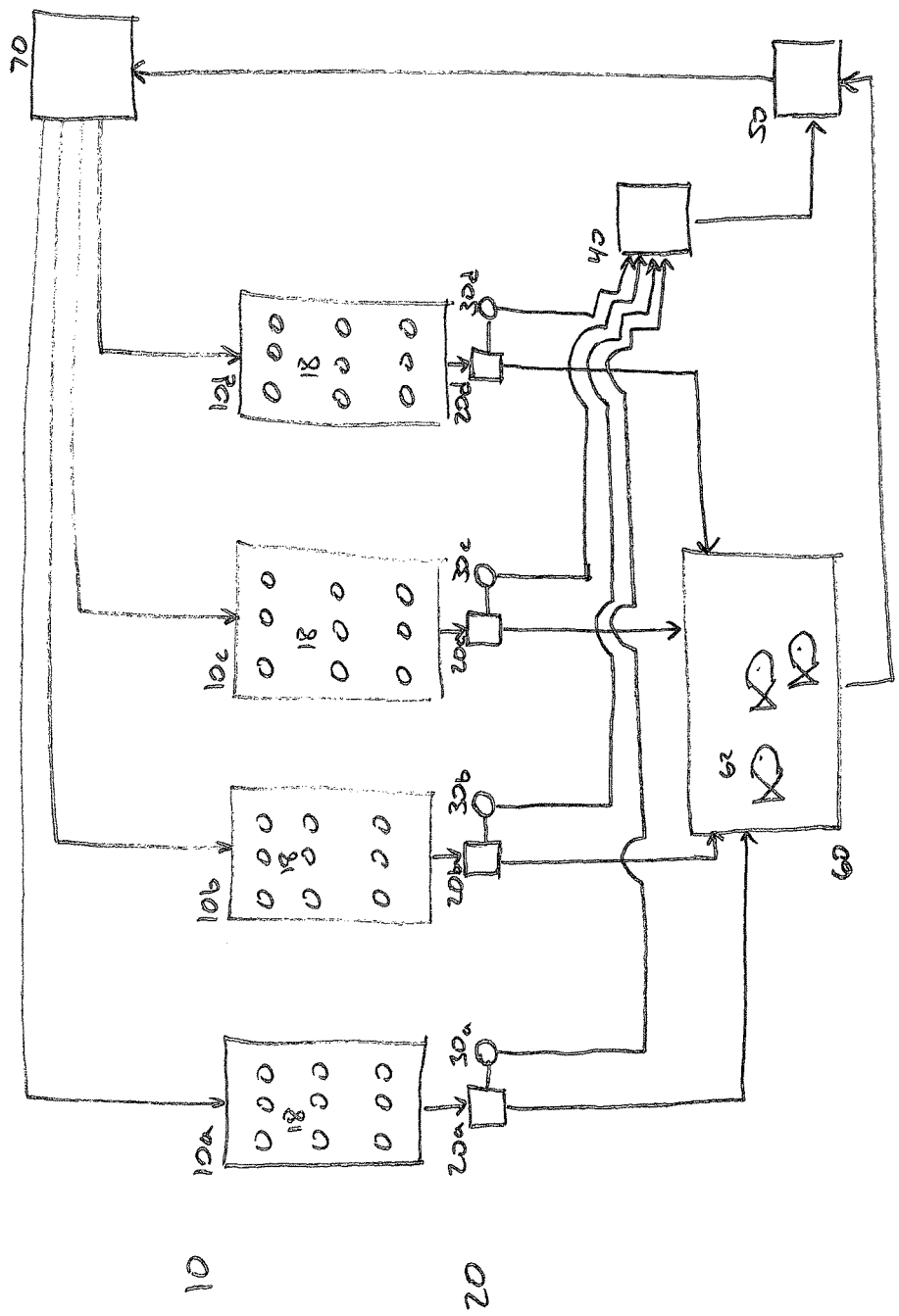
FIG. 1 illustrates a schematic drawing of the controlled aquaponic system of the present invention.

The present invention provides a controlled aquaponic system for use with multiple grow beds. In one embodiment of the invention, referring to FIG. 1, there are multiple grow beds 10a-d. Each grow bed is configured to sustain plants 18 that can be raised in an aquaponic or hydroponic system. Grow beds 10a-d are connected to horizontal bell siphons 20a-d, respectively. There are sensors 30a-d connected to bell siphons 20a-d for sensing water discharge from the siphons. The sensors 30a-d are operably connected to controller 40, which is in communication with pump 50. Horizontal bell siphons 20a-d are also connected to tank 60, which houses aquatic species 62. Tank 60 further connects through pump 50 to index valve 70, which feeds back into beds 10a-d.

In accordance with this embodiment of the present invention, the controlled aquaponic system is operated as follows. Index valve 70 is initiated to start in its first position and pump 50 is turned on. Water from tank 60 is moved from the tank, through pump 50, across index valve 70 and into bed 10a. The water entering bed 10a contains nutrients provided by the aquatic species 62 in tank 60. Plants 18 in bed 10a are fed the desired nutrients from the water while the bed fills. Horizontal bell siphon 20a is operably connected with bed 10a such that as the water fills the bed the horizontal siphon also fills with water. When bed 10a reaches the desired fluid level, horizontal bell siphon 20a triggers the siphon action and water is discharged out of the bed. As the water flows out bed 10a through horizontal siphon 20a, discharge sensor 30a sends a signal to controller 40 to indicate water flow. Controller 40 is programmed to cut the power to pump 50 for a predetermined length of time. The loss of power to pump 50 interrupts fluid flow to index valve 70, triggering an advance in the valve to the next position of delivery. After the predetermined length of time, power is restored to pump 50 by controller 40 and water from tank 60 is delivered through pump 50, across index valve 70, and into the next grow bed, 10b. In this manner, sensors 30a-d, controller 40, pump 50 and index valve 70 work in conjunction to selectively deliver the nutrient laden water from tank 60 into beds 10a-d.

The external location of horizontal bell siphon 20 more efficiently utilizes the limited space of bed 10 for growing plants 18. This location also allows easier installation and service of sensor 30. In addition, the external location prevents unwanted roots from penetrating into horizontal bell siphon 20, thus minimizing the care and maintenance needed to operate the system. Further, the external location avoids harmful disruption of plant 18 roots and promotes higher plant yields.

In one embodiment of the present invention, horizontal bell siphon 20 is modified with an overflow safety feature to prevent flooding of bed 10. In another embodiment of the present invention, controller 40 can also be programmed to measure water flow across sensor 30 and detect conditions that might lead to flooding of tank 60. If flood conditions are detected, controller 40 can send a stop signal to pump 50 and prevent further delivery of water to beds 10a-d until the flood condition is rectified.

Figure 2:
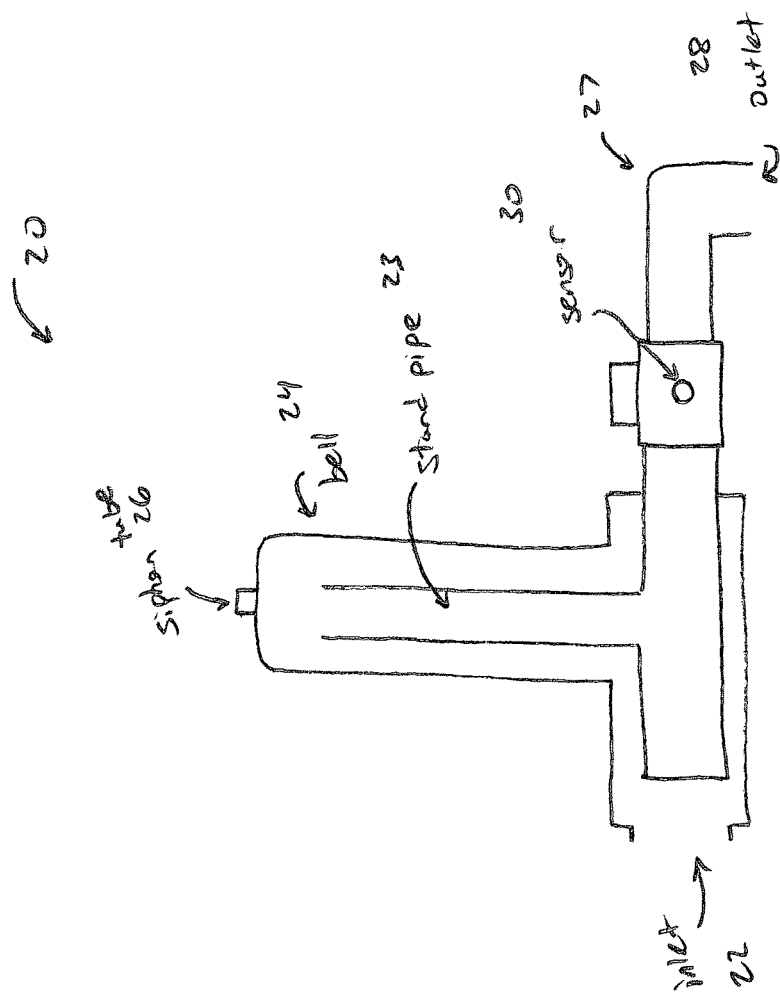
FIG. 2 illustrates the horizontal bell siphon used in the present invention.

Referring to FIG. 2, the horizontal bell siphon used in the present system is explained as follows. Horizontal bell siphon 20 has an inlet 22, wherein water is discharged from bed 10 (not shown) into the siphon. There is a bell 24 in the siphon that accommodates the rising water level, with the bell 24 surrounding stand pipe 23. As the water rises, air in the system is trapped inside bell 24 and stand pipe 23. When the water level reaches the height of stand pipe 23, the water flows into stand pipe 23 and begins the siphon action of the water by pulling water through inlet 22 and out stand pipe 23. The siphoning action continues until the water level reaches the bottom of bed 10 (not shown) and the siphon is broken. According to the present invention, sensor 30 is located at a position along outlet tube 27 distal to stand pipe 23. When the siphon action begins, sensor 30 detects water flow in outlet tube 27 and send an appropriate signal to controller 40. In like manner, when the siphon action is broken, sensor 30 can also send a signal to controller 40 indicating the cessation of flow across the sensor.

In one embodiment of the present invention, controller 40 is a durable electronic circuit with plug-and-play connectivity and programmable features. Controller 40 may be programmed with low water sensor alarms and pump shut off controls. Controller 40 may also run continuously or it can operate on a timer. It is desirable that controller 40 can be operated with either ac or dc current feeds. According to the invention, controller 40 can be programmed for various safety features using sensor 30 or additional sensors to respond to various system conditions with an overflow bypass action, overflow rotation action, siphon valve action, low water action, and other associated actions.

In accordance with the present invention, controller 40 can programmed to respond to the varying needs of beds 10a-d while preventing unpredictable loading of tank 60. In this fashion, beds 10a-d can, in turn, be filled and discharged at customized levels and hold times without jeopardizing the health of aquatic species 62. Thus, the present invention accommodates the production of various plant crops all utilizing the same tank 60.

Figure 3:
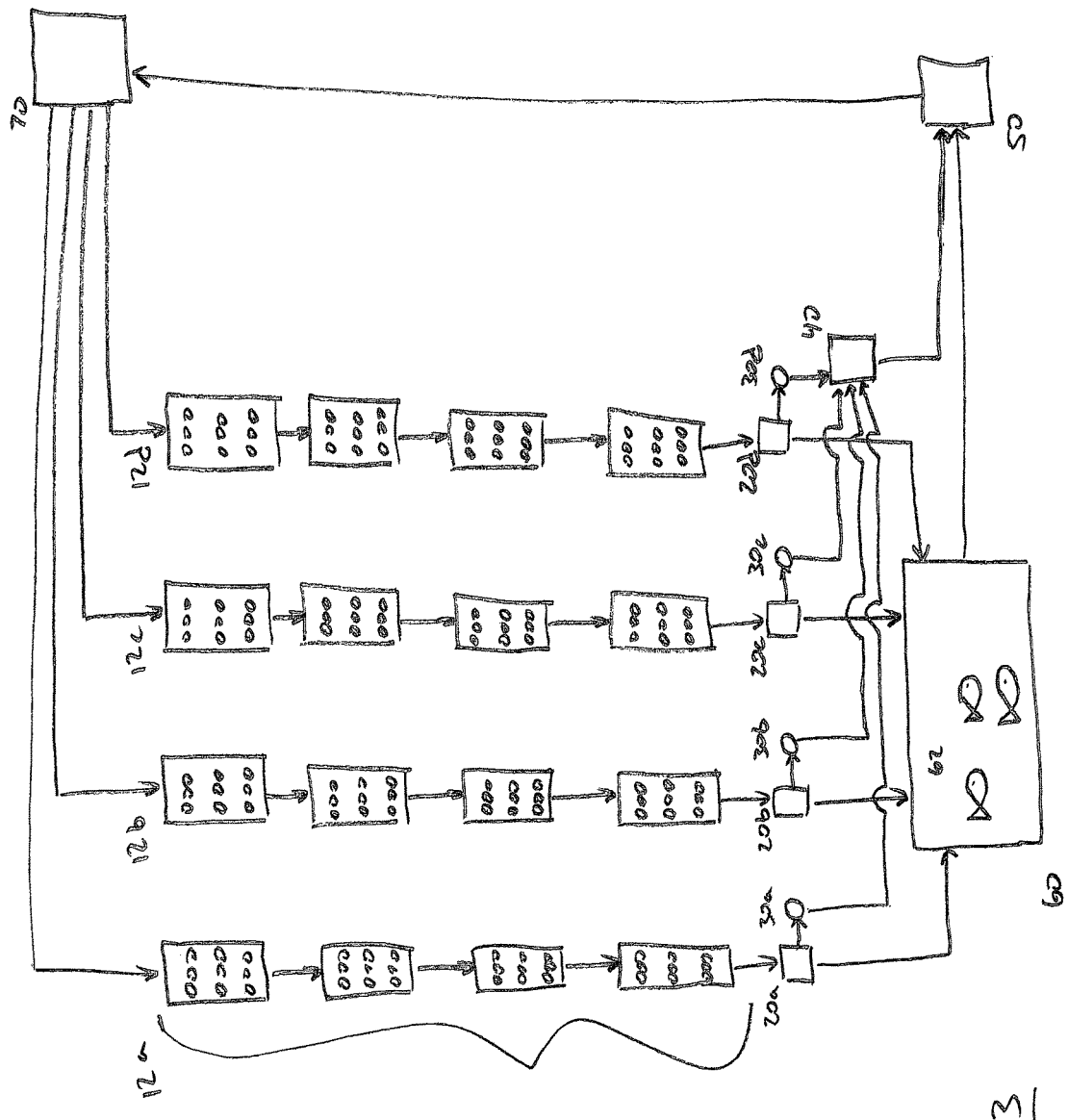
FIG. 3 illustrates a multiple bed array according the present invention.

In another embodiment of the present invention, referring to FIG. 3, single grow beds 10a-d are replaced with bed arrays 12a-d, which comprise multiple grow beds in each array. In this fashion, a single horizontal bell siphon and sensor unit, e.g. horizontal bell siphon 20a and sensor 30a, can be connected to a tier of beds. Thus, the aquaponic system of the present invention can be selectively configured to accommodate a string of organized grow beds without shocking or overloading tank 62.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The invention claimed is:

1. A controlled aquaponic system comprising:
   an index valve, a controller, a pump, an aquatic species tank, and a plurality of grow beds having associated siphons and flow sensors,
   wherein the index valve, grow beds, siphons, aquatic species tank, and pump are in fluid connection with each other such that water can flow across the index valve and into the grow beds, then out of the grow beds, through the siphons and back to the pump for recirculation across the index valve;
   wherein the flow sensors detect water flow conditions within the siphons and communicate the flow conditions to the controller;

wherein the controller selectively operates the pump to send water across the index valve and into the grow beds;

wherein the index valve has a plurality of positions for selectively sending water to one or more grow beds; and wherein the siphons are located entirely external of the grow beds.

2. The controlled aquaponic system of claim 1, wherein the siphons are bell siphons configured in a position horizontal to the grow beds.

3. The controlled aquaponic system of claim 2, wherein the siphons are configured with an overflow safety feature.

4. The controlled aquaponic system of claim 1, wherein the controller is an electronic circuit with plug-and-play connectivity.

5. The controlled aquaponic system of claim 4, wherein the controller is programmable.

6. The controlled aquaponic system of claim 5, wherein the controller has a low-water sensor alarm.

7. The controlled aquaponic system of claim 4, wherein the controller is programmed to interpret water flow signals from the sensors to detect flooding of the grow beds.

8. The controlled aquaponic system of claim 5, wherein the controller has programmable safety features.

9. The controlled aquaponic system of claim 1, wherein the controller has both an alternating and a direct current electrical supply.

10. The controlled aquaponic system of claim 4, wherein the controller is programmable to support customized hold times for selective grow beds to accommodate different crop needs.

11. A controlled aquaponics system comprising:
an index valve, a controller, a pump, an aquatic species tank, and a plurality of grow bed arrays having associated siphons and flow sensors, the grow bed arrays each comprising a plurality of individual beds connected in series, wherein the index valve, grow bed arrays, siphons, aquatic species tank, and pump are in fluid connection with each other such that water can flow across the index valve and into the grow bed arrays, then out of the grow bed arrays, through the siphons and back to the pump for recirculation across the index valve;

wherein the flow sensors detect water flow conditions within the siphons and communicate the flow conditions to the controller;

wherein the controller selectively operates the pump to send water across the index valve and into the grow bed arrays;

wherein the index valve has a plurality of positions for selectively sending water to one or more grow bed arrays; and wherein the siphons are located entirely external of the grow bed arrays.

12. The controlled aquaponic system of claim 11, wherein the siphons are bell siphons configured in a position horizontal to the grow bed arrays.

13. The controlled aquaponic system of claim 12, wherein the siphons are configured with an overflow safety feature.

14. The controlled aquaponic system of claim 11, wherein the controller is an electronic circuit with plug-and-play connectivity.

15. The controlled aquaponic system of claim 14, wherein the controller is programmable.

16. The controlled aquaponic system of claim 15, wherein the controller has a low-water sensor alarm.

17. The controlled aquaponic system of claim 14, wherein the controller is programmed to interpret water flow signals from the sensors to detect flooding of the grow bed arrays.

18. The controlled aquaponic system of claim 15, wherein the controller has programmable safety features.

19. The controlled aquaponic system of claim 14, wherein the controller is programmable to support customized hold times for selective grow bed arrays to accommodate different crop needs.

20. A method of controlling a multiple grow bed aquaponic system comprising the steps of:
configuring a plurality of grow beds in fluid connection with an aquatic species tank, a pump, and a valve;
positioning bell siphons entirely external to the grow beds such that water from each grow bed can flow through the bell siphon into an aquatic species tank;
sensing the flow conditions inside the bell siphons;
controlling the pump in accordance with the sensed flow conditions inside the bell siphons;
activating the valve to selectively distribute water from the tank, through the pump and into the grow beds.

* * * * *